United States Patent
Avinash

(10) Patent No.: US 8,098,950 B2
(45) Date of Patent: Jan. 17, 2012

(54) METHOD AND APPARATUS FOR SEGMENTATION-BASED IMAGE OPERATIONS

(75) Inventor: Gopal B. Avinash, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 1796 days.

(21) Appl. No.: 10/723,189

(22) Filed: Nov. 26, 2003

(65) Prior Publication Data

US 2005/0110802 A1    May 26, 2005

(51) Int. Cl.
*G06K 9/40* (2006.01)
(52) U.S. Cl. ..................... 382/261; 382/173
(58) Field of Classification Search .............. 382/173, 382/261, 128–132, 254–327
See application file for complete search history.

(56) References Cited

U.S. PATENT DOCUMENTS

| | | | |
|---|---|---|---|
| 5,923,775 A * | 7/1999 | Snyder et al. | 382/172 |
| 6,574,362 B1 * | 6/2003 | Kita | 382/162 |
| 7,006,709 B2 * | 2/2006 | Kang et al. | 382/294 |
| 2002/0093686 A1 * | 7/2002 | Fan et al. | 358/3.08 |
| 2003/0095715 A1 * | 5/2003 | Avinash | 382/260 |
| 2004/0114829 A1 * | 6/2004 | LeFeuvre et al. | 382/275 |

* cited by examiner

*Primary Examiner* — Bhavesh Mehta
*Assistant Examiner* — Sean Motsinger
(74) *Attorney, Agent, or Firm* — Fletcher Yoder

(57) ABSTRACT

A technique is provided for processing image data based upon determination of whether pixilated data tends to represent or exhibit one characteristic or another. Many such characteristics may be considered, such as whether the pixels probably represent structures or non-structures. Multiple thresholds for the classification of segmentation are used, and pixels falling within an overlapping regions are processed as if they exhibited both characteristics. Subsequent processing may include assignment of values for the overlapping pixels, such as by weighted blending.

24 Claims, 3 Drawing Sheets

| NS | OL | OL | NS |
|----|----|----|----|
| OL | S  | S  | OL |
| OL | S  | S  | OL |
| NS | OL | OL | NS |

|    | OL | OL |    |
|----|----|----|----|
| OL | S  | S  | OL |
| OL | S  | S  | OL |
|    | O  | L  |    |

| NS | OL | OL | NS |
|----|----|----|----|
| OL |    |    | OL |
| OL |    |    | OL |
| NS | OL | OL | NS |

|     | BOL | BOL |     |
|-----|-----|-----|-----|
| BOL |     |     | BOL |
| BOL |     |     | BOL |
|     | BOL | BOL |     |

METHOD AND APPARATUS FOR SEGMENTATION-BASED IMAGE OPERATIONS

BACKGROUND OF THE INVENTION

The present invention relates generally to the field of image processing and image segmentation. More particularly, the invention relates to a technique for processing image data that permits more flexible processing image data to render the processed images more clear, intuitive and useful.

Many applications and settings exist for digital image processing. By way of example, many images are created in the medical diagnostics contexts by use of specific imaging modalities or combination of modalities. These include modalities such as magnetic resonance imaging (MRI) systems, computed tomography (CT) imaging systems, positron emission tomography (PET) imaging systems, ultrasound imaging systems, tomosynthesis systems, X-ray systems, and so forth. These and other modalities and the devices are used in other settings, such as part and partial inspection, quality control, and more generally in the production of processing of any digital imaging.

Digital image data is generally collected and processed in many ways to form data appropriate for reconstruction of a useful image. The image is comprised of an array of discrete picture elements or pixels that, when viewed, form a composite image. The pixelated data may be processed in different ways depending upon the nature of the data, the type of acquisition system used to create the data, the subject matter visible in the reconstructed image, and more generally the intended use of the reconstructed images. A wide range of such processing techniques is known and presently in use throughout the imaging community. Such conventional processing techniques are not, however, without drawbacks.

For example, many imaging techniques make use of various forms of mask or maps formulated by analysis of image data and decisions on classification of the image data. One type of map commonly utilized divides image data into structures and non-structures for example. When such divisions are made, it is common in image processing to treat one set of data, corresponding to a particular mask, in one manner and another set of data, typically exclusive of the data in the first mask, in a different manner. This is particularly true of image processing that divides images into structures and non-structures. However, such masking and processing of data takes many forms and may be performed several times on the same data to enhance the image reconstructed from the processed data.

The practice of subdividing and analyzing image data by type, such as by classification of individual pixels as representing structure or non-structure is highly effective in processing certain types of images, and renders excellent results that can be used for careful analysis and, in the medical context, diagnosis and treatment. However, for more nuanced images, or images where such classification is somewhat unclear, the subdivisions may result in inadvertently emphasizing or de-emphasizing portions of the image data that actually results in a reconstructed image that is somewhat more difficult to analyze, such as due to loss of contrast, loss of detail, and so forth.

There is, at present, a need to combine multiple image processing operations, such as those performed on structures and non-structures in a seamless fashion such as to combine operations and reduce any tendency to produce artifacts or abrupt shifts from one operational mode to the other, impairing visualization. One method for solving this problem is to spatially transition from one operation to the other by blending one operation with the other based on spatial distance. While this approach addresses the transition-related artifacts, it does not correct for errors in the segmentation of the image data, as between structures and non-structures. Again, such errors cause many undesirable results in image visualization. In the case of structures, results can appear to enhance false structures, or, conversely, result in the loss of contrast where structures should be recognized.

BRIEF DESCRIPTION OF THE INVENTION

The present invention provides a novel technique to image processing designed to respond to such needs. The technique is based upon a "fuzzy" or flexible segmentation-based image operation, sometimes referred in the present context as FUSION. The technique is base upon the analysis of image data to create one or more masks or maps. However, unlike previous techniques, the masked or mapped data is not processed strictly separately, but at least two thresholds for such masking are developed and utilized, resulting in a subdivision of the image data into a plurality of regions beyond two. In a present implementation, two such thresholds are employed, resulting in data that is classified more clearly by one characteristic data which is classified by a different characteristic, and data which is neither clearly of the first characteristic or the second. The latter set of data is treated as both a member of the first characteristic group and the second. Any suitable function may be employed for the classification, and linear and non-linear functions are presently contemplated. Further processing, then, is performed in accordance with any conventional techniques, although the processing treats the overlapping classification data as members of both the first group and the second group. Subsequent processing can include blending of the image data to allow for reconstruction. The blending itself can also depend upon the degree to which the overlapping classification data tended towards one characteristic or another.

The invention contemplates methods, systems and computer programs designed to implement such techniques.

DETAILED DESCRIPTION OF SPECIFIC EMBODIMENTS

Figure 1:
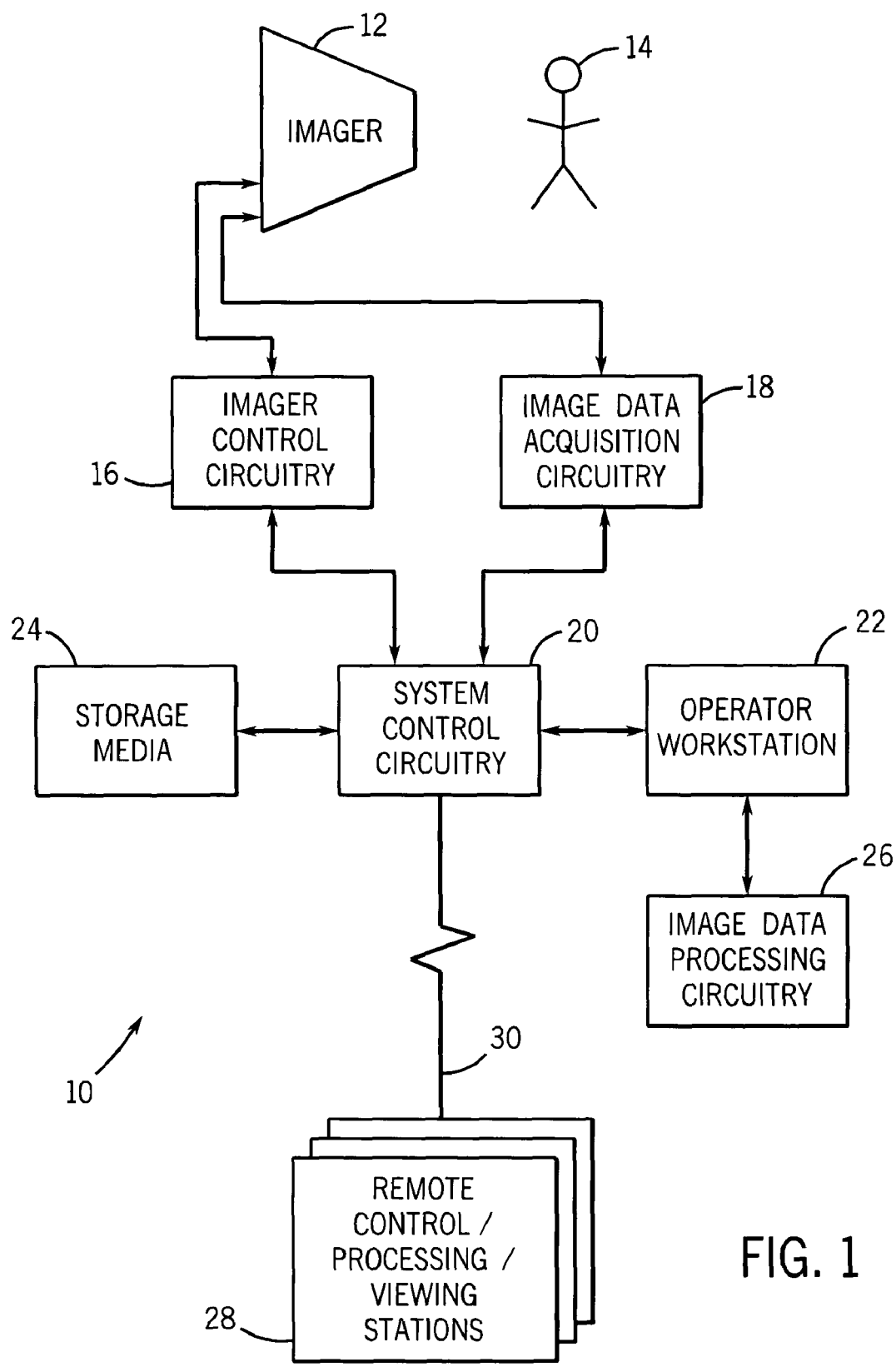
FIG. 1 is a diagrammatical representation of an exemplary imaging system designed for implementation of the present technique.

Turning now to the drawings and referring first to FIG. 1, an imaging system 10 is illustrated generally as including an imager 12 for creating image data of a subject 14. Although a human figure is generally shown as the subject 14, it should be borne in mind that any appropriate subject could be imaged. In the present context, for example, the subject may be human or animal, animate or in-animate, such as manufactured parts, naturally occurring subjects and so forth. Indeed, the imaging system 10 may be any suitable type of system that produces digitized image data based upon some imaging physics. In the medical imaging context, as elsewhere, such imaging systems may include MRI systems, PET systems, CT system, tomosynthesis systems, X-ray systems, ultrasound systems, among many other imaging modalities. The systems may also include conventional photographic imaging systems that produce digitized image data based upon received radiation of any suitable bandwidth or frequency.

In the diagrammatical view of FIG. 1, the imaging system includes an imager 12 coupled to imager control circuitry 16 and image data acquisition circuitry 18. Depending upon the modality and physics of the system, the imager will typically either emit some type of radiation, as with X-ray, CT, tomosynthesis, and other systems. Other active imaging systems, such as MRI systems, influence subjects by excitation, such as through generation of radio frequency pulses in the presence of controlled magnetic fields. In all these cases, however, the imager is regulated in its operation by the imager control circuitry 16. Such control circuitry may take any suitable form, and typically includes circuitry for activating the imager, receiving radiation or other signals, creating any excitation signals or radiation required for imaging, and so forth. The image acquisition circuitry 18, then, receives and initially processes data received by imager. Such initial processing may include conversion of analog signals to digital signals, filtering of the analog or digital signals, scaling or dynamic range adjustments, and the like.

The image control circuitry 16 and the image data acquisition circuitry 18 are generally regulated by some type of system control circuitry 20. Again, depending upon the nature of the imaging system and the physics involved, the system control circuitry may initiate imaging sequences by exchanging appropriate signals with the imager control circuitry 16. The system control circuitry 20 may also receive the raw or pre-processed image data from the image data acquisition circuitry 18. The system control circuitry 20 may, particularly in more complex systems, be coupled to an operator workstation 22 where an operator selects, configures, and launches examination or imaging sequences. The image data, either raw, partially processed or fully processed, is typically stored in some type of storage media as represented at reference numeral 24. In the present context, such storage media may be part of the system control circuitry 20, the operator workstation 22, or any other component of the overall system. In a medical diagnostics context, for example, such storage media may include local and remote memory, both magnetic and optical, and may include complex picture archive and communication systems (PACS) designed to store and serve image data upon demand.

In the illustration of FIG. 1, the operation workstation 22 is shown as coupled to image data processing circuitry 26. Again, such processing circuitry may actually be distributed throughout the system, and may embody hardware, firmware, and software designed to process the image data to produce reconstructed images for viewing. In accordance with the present techniques described below, the image processing circuitry 26 performs FUSION processing on the image data to manipulate the raw or pre-processed data so as to further enhance the usability of the reconstructed images. The image data processing circuitry 26 may be local to the imaging system, as illustrated generally in FIG. 1, or may be completely remote from the system, and simply access the image data, as from the storage media 24 for post-processing. Finally, FIG. 1 illustrates various remote control/processing/viewing stations 28 that can be coupled to the imaging system by appropriate network links 30. Such stations may be used for further viewing, analyzing, and processing the image data as described herein.

As will be appreciated by those skilled in the art, image data of the type acquired on many different imaging systems is generally processed by various filtering, and enhancement techniques to recognize, clarify, or otherwise manipulate discrete picture elements or pixels that are encoded by the image data. Each pixel typically includes data descriptive of its location and its intensity, or in color systems, its intensity in several different colors. The enhancement of the image data is performed by mathematically computing various characteristics of each pixel and of neighboring pixels so as to recognize and treat the pixels in useful groups. Essentially, the image data is most useful when a human or machine can recognize groups of pixels that share certain qualities or characteristics. For example, structures and non-structures may be recognized in image data by various processes. The structures may represent edges, surfaces, contours, regions, colors, and other image features that, when viewed by a human or machine viewer, render the image useful or subject to some type of interpretation. The present FUSION techniques facilitate such processing by adding a degree of flexibility to the classification and processing that did not exist in heretofore known techniques.

Figure 2:
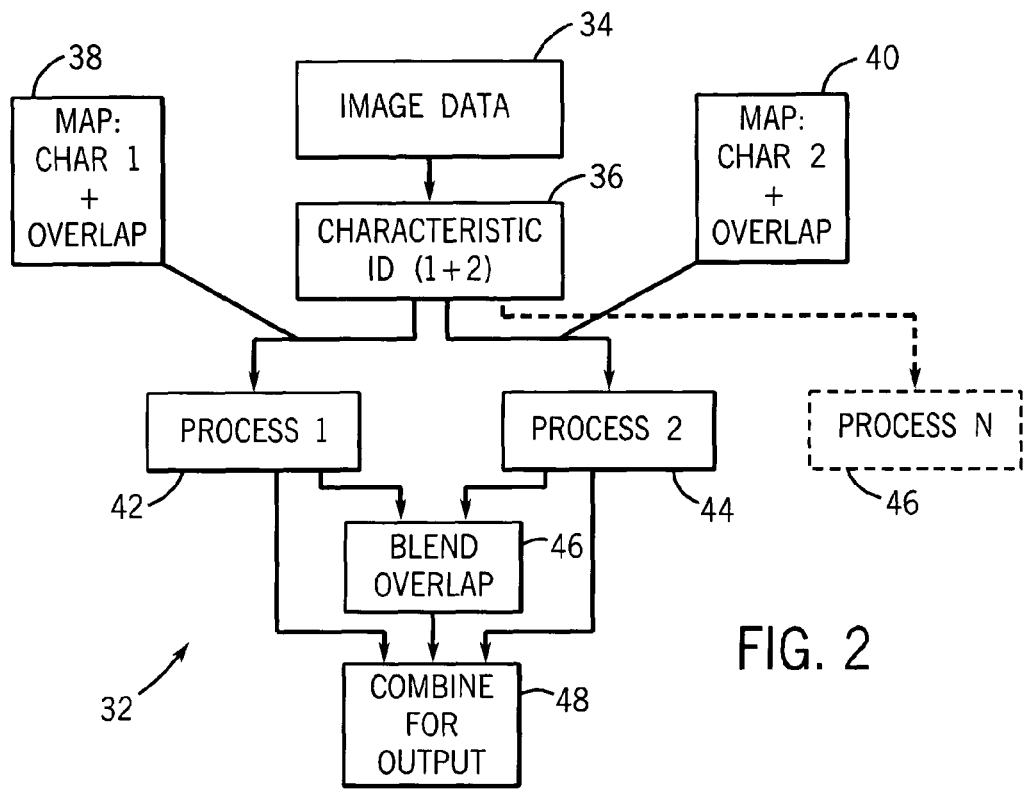
FIG. 2 is a flow chart representing exemplary steps in logic for implementing the present technique for various operations or processes performed on characteristically identified image data.

FIG. 2 illustrates exemplary steps in the FUSION process, represented generally by reference numeral 32. The process generally begins with image data as indicated by reference numeral 34. This image data is noted above, may be raw image data, pre-processed image data, and may have undergone various types of conversion and analysis prior to implementation of the process. The image data will typically be stored in a storage medium as indicated in reference to FIG. 1. The image data is then accessed, and the FUSION process is performed by identifying characteristics of the pixels defined by the image data, as represented at reference numeral 36. Many such characteristic identification processes are known and available to those skilled in the art. For the present purposes, the characteristic may be any desired identifiable quality of the pixels, and is typically determined by analyzing the pixel intensity, and its relationship to the intensities of neighboring pixels defined by the image data. The resulting characteristic identification produces maps or masks 38 and 40.

Maps 38 and 40 may be thought of as representing images, typically of the same dimensions as the image defined by the original image data, wherein each pixel is assigned a value representative of the characteristic identification. For example, where only two mutually exclusive characteristics are identified, the maps may assign values of 0 and 1 to each pixel. These maps are typically then used, in previous techniques, for mutually-exclusive processing. By the FUSION technique, each of the masks is used to perform processes, denoted as process 1 and process 2 by reference numerals 42 and 44 in FIG. 2. However, as described more fully below, unlike previous techniques, the FUSION processing permits classification of individual pixels into both the first group or map characteristic and the second. Thus, certain pixels may be classified as both exhibiting characteristic 1 and characteristic 2, although perhaps in different degrees. It should be noted, while first and second processes or operations are discussed in the present description, in practice a multitude of such classifications and processing may be provided. Thus, FIG. 2 represents a "process N" so as to open the potential for multiple such classifications, in which certain pixels are classified by exhibiting multiple possible characteristics, typically exclusive in heretofore known techniques, and the processing follows accordingly.

After processing of the pixels in accordance with maps 38 and 40, the FUSION technique calls for blending of certain overlapping pixels at step 46. Because certain of the pixels have been classified as exhibiting both characteristic 1 and characteristic 2, these "overlapping" pixels are assigned values that are actually blended from the values resulting from process 1 and process 2. In the presently contemplated implementation, it is only the overlapping pixels that are blended in this manner, although other blending techniques could be employed. In step 48, then, the blended overlapping pixels are combined with the pixels that clearly or exclusively exhibited characteristics 1 and 2, to form an output dataset.

Figure 3:
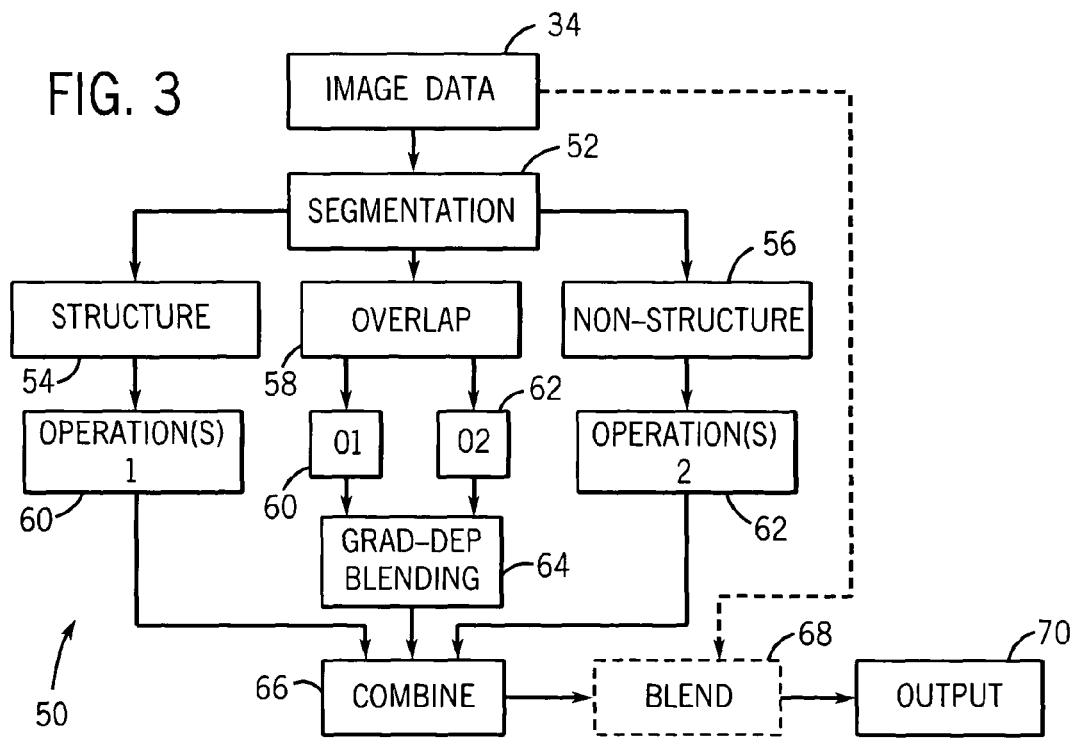
FIG. 3 is a flow chart representing a particular implementation of the technique of FIG. 2 for processing of data representative of structures and non-structures in an image.

The foregoing general process is described now in relation to a specific implementation wherein the characteristic identified and mapped is the probability that a pixel represents usefully identified structures or, conversely, represents non-structures. This FUSION structure processing is shown in FIG. 3 and designated generally by reference numeral 50.

The FUSION structure processing 50 begins with accessing the image data 34 in a manner described above. The correct characteristic identification step of FIG. 2 is here implemented by segmentation as indicated at reference numeral 52. As will be apparent to those skilled in the art, such segmentation may be performed in many different manners, and generally aims at recognizing intensity levels and variations that probabilistically represent edges, meaningful surfaces and regions, and so forth. The segmentation may depend upon the physics of the imaging system, the nature of the data acquired, the dynamic range of the data, contrast present between pixel data, signal-to-noise ratios, and so forth.

Figures 4, 5, 6, 7, 8:
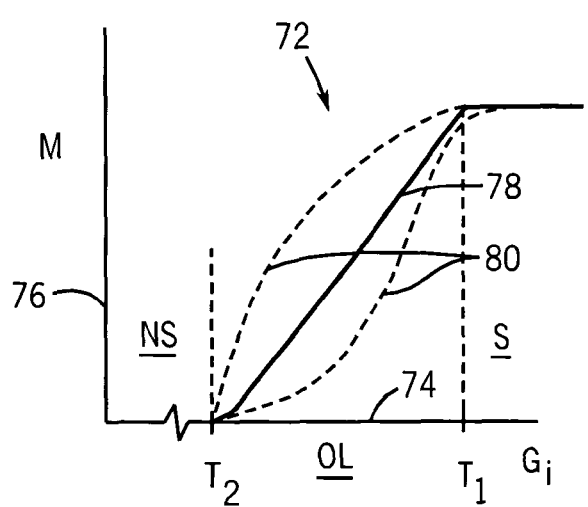
FIG. 4 is a graphical representation of one manner of classifying and processing image data in a flexible manner in accordance with the present FUSION technique.
FIGS. 5-8 are diagrammatical representations of a portion of an image illustrating how variously classified data is processed, as by the processes of FIG. 2 or 3, in accordance with the FUSION technique.

The segmentation performed at step 52, in previous techniques, results in maps or masks representative of structures and non-structures. Moreover, heretofore known techniques typically classify each pixel as either a structural pixel or a non-structural pixel, to the exclusion of the opposite classification. By the present FUSION technique, however, at least three maps are produced, including a map representing structure, indicated at reference numeral 54, a map representing non-structure, as represented at reference numeral 56, and an overlapping structure/non-structure map as indicated at reference numeral 58. The mapping can be performed in many different ways, and may be discrete or continuous. FIG. 4 illustrates an exemplary approach to the FUSION mapping of multiple characteristics as might be performed to obtain maps 54, 56 and 58. As illustrated in FIG. 4, a classification and weighting function 72 is defined to relate an image characteristic, such as the gradient level of each pixel, indicated along horizontal axis 74, to a classification parameter indicated on a vertical axis 76. The functions 72 may also be considered a weighting function for assignment of blending values as discussed below.

As will be apparent to those skilled in the art, many previous and useful imaging techniques require establishment of a threshold for classification of each pixel in the image data by a representative characteristic of interest. For example, in typical structure and non-structure processing, a single threshold is used to determine whether a pixel should be processed as structure or as non-structure. In the present FUSION technique, on the other hand, and as illustrated by FIG. 4, classification is performed to establish both non-structure pixels as represented towards the left in FIG. 4, structure pixels, as represented towards the right in FIG. 4, and pixels falling in an overlapping region between thresholds. In the illustrated embodiment, two such thresholds are employed, indicated as $T_1$ and $T_2$ in FIG. 4. Pixels having gradient values lower than threshold $T_2$ are then classified as non-structure, while pixels having a gradient value above $T_1$ are classified as structure. Pixels having gradient values between the thresholds are classified as overlapping pixels, that is, as exhibiting potentially structural characteristics and non-structural characteristics. It should be borne in mind, as noted above, that although three such regions are illustrated in FIG. 4 and discussed herein, further classification into many such regions is possible. Indeed, continuous or near-continuous classification and weighting may be performed where desired. In practice, a third parameter may be implemented, which may be referred to as a focus-threshold that falls between threshold $T_1$ and $T_2$ to control the symmetry of the overlap. It should also be borne in mind that, although the classification illustrated in FIG. 4 is performed in the gradient domain, many other image characteristics may be used as a reference for the processing classification, including the processing of structures and non-structures, and processing by other image data characteristics. Such characteristics may include connectedness of structures and non-structures can be used to modify how processing is performed. When connectedness is used as a criterion, small islands of non-structures in structures are treated as structures and small islands of structures in non-structures are treated as non-structures.

Returning to FIG. 3, with the pixels thus classified and mapped, processing operations are performed on the pixels as indicated at steps 60 and 62. Many such operations may be performed, and as illustrated in FIG. 3, an operation 1 is performed on structural regions or pixels, while an operation 2 is performed on non-structural pixels. Moreover, operations 1 and 2 are both performed on pixels considered to be overlapping pixels.

FIGS. 5, 6 and 7 illustrate an exemplary manner in which such pixels may be processed. As shown in FIG. 5, in an exemplary array of 16 pixels, certain pixels may be classified as structure (the four center pixels in the example), while other pixels are classified as non-structure (the four outlying corner pixels in the illustration). Other pixels are classified as overlapping pixels, that is, pixels having gradient intensities falling between thresholds $T_1$ and $T_2$. As shown in FIG. 6, the operation 1, then, is performed on the structural pixels and the overlapping pixels. Operation 1 is performed, in the illustrated example, to the exclusion of the non-structural pixels. Similarly, operation 2 is performed on the non-structural pixels and the overlapping pixels, as illustrated in FIG. 7. In this embodiment, operation 2 is performed to the exclusion of the structural pixels only. Where more groups or maps are provided, multiple such combinations may be processed.

Many individual processes are presently contemplated for operations 1 and 2 or more generally for processes 1 and 2 discussed above. In the case of structure and non-structure processing, for example, such processing or operations may include enhancement, sharpening, smoothing, deconvolution, interpolation, extrapolation, compression, digital halftoning, contrast matching, and so forth. These processes may be performed, by way of example, as indicated below in Table 1.

TABLE 1

| Processing Method | Operation N1 | Operation N2 |
|---|---|---|
| Enhancement | Anisotropic smoothing and sharpening | Isotropic smoothing |
| Sharpening | Anisotropic sharpening | None or minimal |
| Smoothing | Anisotropic smoothing | Isotropic smoothing |
| Smoothing | Median smoothing (smaller kernel) | Median or isotropic smoothing with larger kernel |
| Deconvolution | Aggressive parameter setting | Null or minimal parameter setting |
| Interpolation | Higher order (bicubic/tricubit or higher) | Lowest order (bilinear/trilinear) |
| Extrapolation | Aggressive parameter setting | Null or minimal parameter setting |
| Compression | Low or minimal compression | Higher compression |
| Digital Half-toning | Error diffusion | Blue-noise masking |
| Contrast matching | None or minimal matching | High degree of matching |

As will be appreciated by those skilled in the art, for example, enhancement performed by anisotropic smoothing and sharpening tends to mitigate noise in structures by smoothing along structures without blurring. Isotropic smoothing, on the other hand, has a tendency to homogenize structures. Sharpening processes might include anisotropic sharpening or isotropic sharpening, tending to sharpen across structures. Such sharpening may be avoided for non-structures to avoid sharpening noise. Smoothing operations that include anisotropic smoothing may be similar in affect to the enhancement operations described above. Other smoothing techniques, such as median smoothing using small kernels tends to provide detail and reduce spike noise. Median smoothing employing larger kernels may have a tendency to suppress structure noise in non-structures.

Other operations may similarly be more or less useful for structural and non-structural pixels. For example, aggressive parameter setting in deconvolution may have the tendency to provide detail enhancement from blurry images. Minimal deconvolution, then, reduces searching for structures and edges in non-structural regions. In interpolating image data, higher order interpolation has the tendency to enhance and better represent edges whereas lower interpolation avoids certain artifacts such as ringing artifacts, Moire patterns, and so forth. Parameter settings in extrapolation may have affects similar to those for convolution. In data compression, the rate of compression may be available and efficient rates of compression may be based on determinations of whether pixels represent structures or non-structures. In digital half-toning operations, it may be preferable to perform error diffusion on structural pixels, while performing other operations, such as blue-noise masking on non-structural pixels. Finally, in the processing illustrated in Table 1, it may generally be preferred to perform little or no contrast matching for structural pixels, while providing a high degree of matching for non-structural pixels, leading to enhancement and visualization of structures and de-emphasis of non-structures.

As noted above, the various operations are performed mutually exclusively on structures and non-structures in the implementation of FIG. 3, while both operations are performed on pixels classified as "overlapping" pixels, that is, those exhibiting potentially structural and non-structural characteristics. At step 64 in FIG. 3, the values for the processed overlapping pixels are blended. Any suitable blending for other process may be used to determine the desired resulting value of the overlapping pixels. In a present technique, however, weighting of the resulting values is performed based upon the gradient intensity. As shown in FIG. 4, the function 72 not only serves to identify and classify pixels into one or the other of the structure and non-structure classifications, or the overlapping classification, but is also used to determine a weighting factor $\alpha$ in a present embodiment, the value of the weighting factor in accordance with the relationship:

$$A_i = (G_i - T_2)/(T_1 - T_2).$$

Depending upon the nature of the function, then, the weighting factor may generally vary with the magnitude of the thresholds and the magnitude of the gradient intensity. The linear relationship expressed by the foregoing formula may be graphically represented by trace 78 in FIG. 4. Other non-linear relationships may, of course, be implemented as represented generally by reference numeral 80 in FIG. 4.

The blending performed at step 64, then, may take the form of:

$$I_i = \alpha_i I_{i(structure)} + (1-\alpha_i) I_{i(non-structure)}.$$

The resulting blending operation, then, affectively provides a value for the individual overlapping pixels that is a function of the degree to which it may be classified as structure or non-structure along the continuum between thresholds $T_{1\ and\ T2}$. The resulting blended values may be represented, in the example provided above, as shown in FIG. 8.

At step 66, these blended values are combined with the structure and non-structure pixel values resulting from operations 1 and 2. At step 68 further blending with initial input image data may be performed to produce an output dataset as indicated at reference numeral 70.

As will be appreciated by those skilled in the art, not only does the present FUSION technique permit more flexible segmentation-based processing, but may result in values of the non-overlapping pixels that are different from those that would result from previous techniques. For example, in the implementation described above, because structural pixels are processed with overlapping pixels, some of which may have been classified in previous techniques as non-structure, the structural pixels themselves may result in different values than they would have had in previous techniques. This is particularly the case where various types of filtering, sharpening, smoothing, and other processing operations consider neighborhoods of pixels for assignment of each pixel value. The same is true for non-structural pixels. That is, because these pixels are processed with other pixels that may have been classified as structures in previous techniques, the resulting values of the non-structural pixels may be different from those of previous processing approaches. The result is enhanced image data which may more accurately represent processed pixel data exhibiting one characteristic or another, or of attending to represent one characteristic over another.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for processing image data comprising:
   segmenting the image data into a first mask representing structure, a second mask representing non-structure, and a third mask where structure and non-structure overlap, wherein each mask has the same dimensions as the image data and comprises pixels having values assigned based on the segmentation of the image data;
   processing pixels of the image data defined by the first mask using a first operation but not a second operation;
   processing pixels of the image data defined by the second mask using the second operation but not the first operation; and
   processing pixels of the image data defined by the third mask using both the first and second operations.

2. The method of claim 1, comprising blending values resulting from processing pixels of the image data defined by the third mask by the first process with values resulting from processing pixels of the image data defined by the third mask by the second process.

3. The method of claim 1, comprising establishing first and second thresholds, and wherein pixels defined by the first mask are identified as having values falling above the first threshold, the pixels defined by the second mask are identified as having values falling below the second threshold, and the pixels defined by the third mask are identified as having values between the first and second thresholds.

4. The method of claim 3, wherein the thresholds are gradient thresholds.

5. The method of claim 2, wherein the blending is performed using a weighting factor determined in accordance with the equation:

$$A_i = (G_i - T_2)/(T_1 - T_2).$$

where $A_i$ is the weight employed at a pixel i, $G_i$ is the gradient intensity value at the pixel i, $T_1$ is a first threshold, and $T_2$ is a second threshold.

6. The method of claim 5, wherein the blending is based on a linear function.

7. The method of claim 1, wherein the operations are selected from a group consisting of enhancement, sharpening, smoothing, deconvolution, extrapolation, interpolation, compression, digital half-toning, and contrast matching.

8. A method for processing image data comprising:
   establishing first and second thresholds;
   generating a first mask image wherein pixels of the first mask image that correspond to pixels of the image data having values above the first threshold are set to a first predetermined value, wherein the first threshold corresponds to structures in the image data;
   generating a second mask image wherein pixels of the second mask image that correspond to pixels of the image data having values below the second threshold are set to a respective predetermined value equal to or different than the first predetermined value, wherein the second threshold corresponds to non-structures in the image data;
   generating a third mask image wherein pixels of the third mask image that correspond to pixels of the image data having values between the first and second thresholds are set to a third respective predetermined value equal to or different than the first predetermined value;
   processing the pixels of the image data based on the first mask image using a first operation and not the second operation;
   processing the pixels of the image data based on the second mask image using a second operation and not the first operation; and
   processing the pixels of the image data based on the third mask image using the first and second operations.

9. The method of claim 8, comprising blending values resulting from processing pixels of the image data defined by the third mask image by the first process with values resulting from processing pixels of the image data defined by the third mask image by the second process.

10. The method of claim 8, wherein the thresholds are gradient thresholds.

11. The method of claim 9, wherein the blending is performed based upon relative proximity of each pixel value to the first and the second threshold.

12. The method of claim 9, wherein the blending is based on a linear function.

13. The method of claim 8, wherein the operations are selected from a group consisting of enhancement, sharpening, smoothing, deconvolution, extrapolation, interpolation, compression, digital half-toning, and contrast matching.

14. The method of claim 8, wherein the pixels of the image data defined by the third mask image are processed in accordance with the first operation along with the pixels of the image data defined by the first mask image, and are processed in accordance with the second operation along with the pixels of the image data defined by the second mask image.

15. The method of claim 9, comprising combining the blended values with values of pixels of the image data defined by the first mask image and by the second mask image resulting from their respective processing.

16. A system for processing image data comprising:
   a data repository for storing image data;
   a processing circuit configured to access image data from the repository, to generate a first mask image, a second mask, and a third mask based on a segmentation of the image data, to process pixels of the image data defined by the first mask image using a first operation and not a second operation and pixels of the image data defined by the second mask image using a second operation and not a first operation, and to process pixels of the image data defined by the third mask image using both the first operation and the second operation.

17. The system of claim 16, further comprising an operator workstation for configuring the operations and for viewing images resulting from the processing.

18. The system of claim 16, further comprising an image data acquisition system for generating the image data.

19. The system of claim 18, wherein the image data acquisition system is selected from a group consisting of MRI systems, CT systems, PET systems, ultrasound systems, X-ray systems and photographic systems.

20. A system for processing image data comprising:
   means for segmenting the image data into a first mask representing structure, a second mask representing non-structure, and a third mask where structure and non-structure overlap, wherein each mask has the same dimensions as the image data and comprises pixels having values assigned based on the segmentation of the image data;
   means for processing pixels of the image data defined by the first mask using a first operation but not a second operation;
   means for processing pixels of the image data defined by the second mask using the second operation but not the first operation; and means for processing pixels of the image data defined by the third mask using both the first and second operations.

21. A system for processing image data comprising:
means for establishing first and second thresholds;
means for generating a first mask image wherein pixels of the first mask image that correspond to pixels of the image data having values above the first threshold are set to a first predetermined value, wherein the first threshold corresponds to structures in the image data;
means for generating a second mask image wherein pixels of the second mask image that correspond to pixels of the image data having values below the second threshold are set to a respective predetermined value equal to or different than the first predetermined value, wherein the second threshold corresponds to non-structures in the image data;
means for generating a third mask image wherein pixels of the third mask image that correspond to pixels of the image data having values between the first and second thresholds are set to a third respective predetermined value equal to or different than the first predetermined value;
means for processing the pixels of the image data defined by the first mask image in accordance with a first operation and not the second operation;
means for processing the pixels of the image data defined by the second mask image in accordance with a second operation and not the first operation; and
means for processing the pixels of the image data defined by the third mask image in accordance with the first and second operations.

22. A non-transitory computer readable medium storing therein a computer executable code for processing image data comprising:
machine readable code stored on the at least one medium for carrying out routines for segmenting a set of image data into a first mask representing structure, a second mask representing non-structure, and a third mask where structure and non-structure overlap, wherein each mask has the same dimensions as the image data and comprises pixels having values assigned based on the segmentation of the image data, processing pixels of the image data defined by the first mask using a first operation but not a second operation, processing pixels of the image data defined by the second mask using the second operation but not the first operation, and processing pixels of the image data defined by the third mask using both the first and second operations.

23. A non-transitory computer readable medium storing therein a computer executable code for processing image data comprising:
machine readable code stored on the at least one medium for carrying out routines for establishing first and second thresholds, generating a first mask image wherein pixels of the first mask image that correspond to pixels of the image data having values above the first threshold are set to a first predetermined value, generating a second mask image wherein pixels of the second mask image that correspond to pixels of the image data having values below the second threshold are set to a respective predetermined value equal to or different than the first predetermined value, generating a third mask image wherein pixels of the third mask image that correspond to pixels of the image data having values between the first and second thresholds are set to a third respective predetermined value equal to or different than the first predetermined value, processing the pixels of the image data defined by the first mask image in accordance with a first operation and not the second operation, processing the pixels of the image data defined by the second mask image in accordance with a second operation and not the first operation, and processing the pixels of the image data defined by the third mask image in accordance with the first and second operations, wherein the first threshold corresponds to structures in the image data and the second threshold corresponds to non-structures in the image data.

24. The method of claim 2, comprising combining the blended values with values of pixels of the image data defined by the first mask and by the second mask resulting from their respective processing.

* * * * *